(12) United States Patent
Chen

(10) Patent No.: US 11,463,753 B2
(45) Date of Patent: Oct. 4, 2022

(54) METHOD AND APPARATUS FOR DOWNLOADING RESOURCES

(71) Applicant: BEIJING DAJIA INTERNET INFORMATION TECHNOLOGY CO., LTD., Beijing (CN)

(72) Inventor: Hao Chen, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/467,914

(22) Filed: Sep. 7, 2021

(65) Prior Publication Data

US 2022/0210493 A1    Jun. 30, 2022

(30) Foreign Application Priority Data

Dec. 31, 2020   (CN) .......................... 202011633248.3

(51) Int. Cl.
*H04N 21/24*     (2011.01)
*H04N 21/472*    (2011.01)
*H04N 21/236*    (2011.01)

(52) U.S. Cl.
CPC ....... *H04N 21/2407* (2013.01); *H04N 21/236* (2013.01); *H04N 21/47202* (2013.01)

(58) Field of Classification Search
None
See application file for complete search history.

(56) References Cited

U.S. PATENT DOCUMENTS

| | | | |
|---|---|---|---|
| 6,654,786 B1* | 11/2003 | Fox ......................... | H04L 67/04 709/219 |
| 6,832,239 B1* | 12/2004 | Kraft .................... | H04L 67/1012 709/217 |
| 7,954,144 B1* | 5/2011 | Ebrahimi ................ | H04L 67/02 709/227 |
| 10,182,096 B1* | 1/2019 | Siddiqi ................. | H04L 65/608 |
| 2002/0062369 A1* | 5/2002 | von Klopp ............ | G06F 16/955 709/224 |
| 2003/0229624 A1* | 12/2003 | Petrisor ................. | G06F 16/951 |
| 2005/0034160 A1* | 2/2005 | Kim ....................... | H04L 12/282 725/74 |
| 2007/0136279 A1* | 6/2007 | Zhou ................... | G06F 16/9566 707/E17.115 |
| 2007/0180025 A1* | 8/2007 | Kobayakawa ......... | G06Q 90/00 709/204 |

(Continued)

*Primary Examiner* — Fernando Alcon
(74) *Attorney, Agent, or Firm* — Frost Brown Todd LLC

(57) ABSTRACT

The present disclosure relates to a method and an apparatus for downloading resources, and a non-transitory computer-readable storage medium, and belongs to the field of Internet technology. The method includes: receiving a resource access request for a target resource from a client, and determining an access address of the resource access request, in which the access address carries an identifier of the target resource; querying a status of the target resource according to the identifier of the target resource carried in the access address; and sending, in response to the target resource being in a first status, a content distribution network address corresponding to the target resource to the client to cause the client to download the target resource according to the content distribution network address.

12 Claims, 6 Drawing Sheets

(56) References Cited

U.S. PATENT DOCUMENTS

| | | | |
|---|---|---|---|
| 2009/0316690 A1* | 12/2009 | Kim | H04L 65/1073 370/352 |
| 2010/0074589 A1* | 3/2010 | Dinallo | H04N 21/4532 386/271 |
| 2011/0126256 A1* | 5/2011 | Wang | H04N 21/435 725/116 |
| 2011/0191811 A1* | 8/2011 | Rouse | H04N 21/42684 725/93 |
| 2013/0159530 A1* | 6/2013 | James | G06F 16/9566 709/226 |
| 2014/0006951 A1* | 1/2014 | Hunter | H04N 21/4314 715/719 |
| 2015/0099507 A1* | 4/2015 | Cassidy | H04L 65/60 455/419 |
| 2017/0017695 A1* | 1/2017 | Higuchi | G06F 16/3329 |

\* cited by examiner

METHOD AND APPARATUS FOR DOWNLOADING RESOURCES

CROSS-REFERENCE TO RELATED APPLICATION

The present application is based on and claim priority under 35 U.S.C. 119 to Chinese Patent Application No. 202011633248.3, filed with the China National Intellectual Property Administration on Dec. 31, 2020, the disclosures of which are herein incorporated by reference in its entirety.

FIELD

The present disclosure relates to a field of Internet technology, and in particular to a method and apparatus for downloading resources, and a non-transitory computer-readable storage medium.

BACKGROUND

CDN (Content Delivery Network) technology is an intelligent virtual network built on the basis of the existing network, which relies on edge servers deployed in various places, and enables users to get the content they need nearby through the load balancing, content distribution, scheduling and other functional modules of the central platform.

SUMMARY

The present disclosure provides a method and an apparatus for downloading resources, and a non-transitory computer-readable storage medium. The technical solutions of the present disclosure are described as follows.

According to embodiments of the present disclosure, a method for downloading resources is provided. The method includes: receiving a resource access request for a target resource from a client, and determining an access address of the resource access request, in which the access address carries an identifier of the target resource; querying a status of the target resource according to the identifier of the target resource carried in the access address; and sending, in response to the target resource being in a first status, a content distribution network address corresponding to the target resource to the client to cause the client to download the target resource according to the content distribution network address.

According to embodiments of the present disclosure, an apparatus for downloading resources is provided. The apparatus includes: one or more processors; a memory storing instructions executed by the one or more processors, in which the one or more processors are configured to execute the instruction to: receive a resource access request for a target resource from a client, and determine an access address of the resource access request, in which the access address carries an identifier of the target resource; query a status of the target resource according to the identifier of the target resource carried in the access address; and send, in response to the target resource being in a first status, a content distribution network address corresponding to the target resource to the client to cause the client to download the target resource according to the content distribution network address.

According to embodiments of the present disclosure, a non-transitory computer-readable storage medium is provided. When an instruction stored therein is executed by a processor in an electronic device, the processor is caused to perform a method for downloading resources. The method includes: receiving a resource access request for a target resource from a client, and determining an access address of the resource access request, in which the access address carries an identifier of the target resource; querying a status of the target resource according to the identifier of the target resource carried in the access address; and sending, in response to the target resource being in a first status, a content distribution network address corresponding to the target resource to the client to cause the client to download the target resource according to the content distribution network address.

With the present disclosure, a server receives a resource access request for a target resource from a client, determines an access address of the resource access request, in which the access address carries an identifier of the target resource, queries a status of the target resource according to the identifier of the target resource carried in the access address, and sends a content distribution network address corresponding to the target resource to the client to cause the client downloading the target resource according to the content distribution network address in response to the target resource being in a first status. Therefore, with the method, problems such as long delay from initiating deletion to taking effect of deletion of the resources stored in the CDN and failure of quickly blocking of files that need to be offline due to the massive nodes of the CDN in the related art may be resolved, which effectively accelerates the speed of blocking files that need to be offline.

It should be understood that the above general description and the following detailed description are only exemplary and explanatory, and cannot limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure, and do not constitute an improper limitation of the present disclosure.

DETAILED DESCRIPTION

In order to enable those skilled in the art to understand the technical solutions of the present disclosure, reference will be made clearly and completely technical solutions in the embodiments of the present disclosure with accompanying drawings.

It should be noted that terms "first" and "second" in the specification and claims of the present disclosure and the accompanying drawings are used to distinguish similar objects, rather than to describe a specific order or sequence. It should be understood that data used in such a manner may be interchanged under appropriate circumstances so that embodiments of the present disclosure described herein may be implemented in a sequence other than the sequence illustrated or described herein. The implementations described in the following exemplary embodiments do not represent all implementations consistent with the present disclosure; instead, the implementations described in the following exemplary embodiments are merely examples of an apparatus and method consistent with the attached claims and some aspects of the present disclosure.

Figure 1:
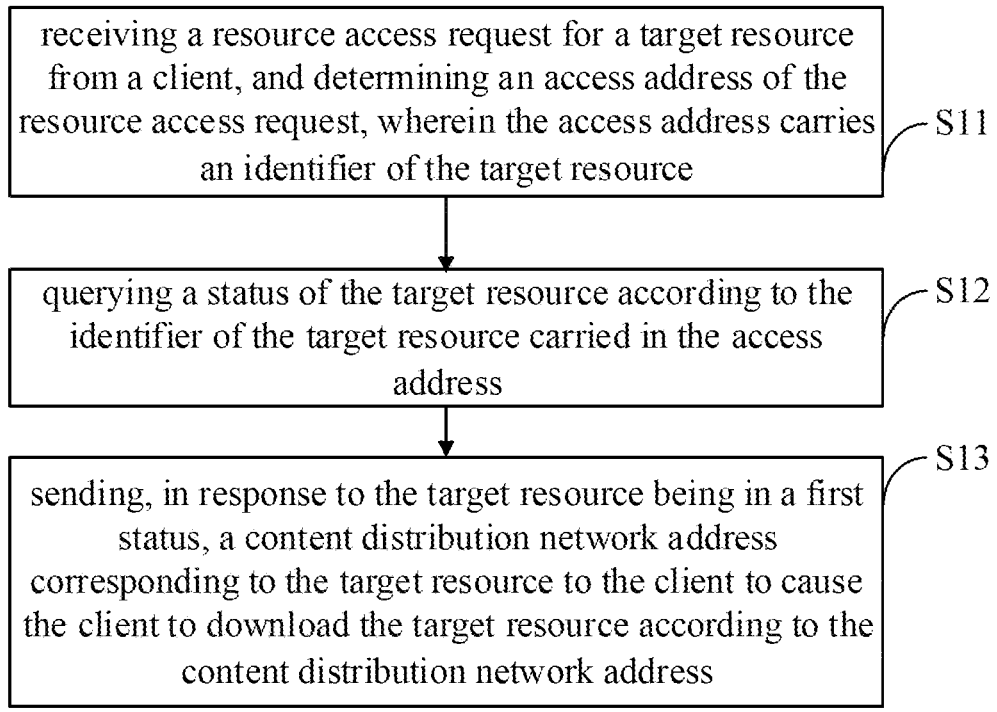
FIG. 1 is a flow chart showing a method for downloading resources according to an exemplary embodiment.

FIG. 1 is a flow chart showing a method for downloading resources according to an exemplary embodiment. As shown in FIG. 1, the method for downloading resources is applied in a business server, and for example, the server may be a backend server corresponding to the business end. The method includes: S11, receiving a resource access request for a target resource from a client, and determining an access address of the resource access request, wherein the access address carries an identifier of the target resource.

The target resource can be a large resource file such as videos and pictures shared by the user through a terminal device to a We Media platform.

In this step, the client requests to connect to the server interface of the business server under the scenario of sharing via the We Media platform, and sends the resource access request of the target resource to the business server.

After receiving the resource access request of the target resource sent by the client, the business server first obtains an identifier of the target resource from the resource access request, and then combines the preset access path with the identifier of the target resource to obtain the access address carrying the identifier of the target resource and send the access address to the client.

For example, the access address may be url:http//host/path?fileld=x, where http represents the url (Uniform Resource Locator) protocol, host represents a host of the url, path represents a preset access path of the url, and fileld=x represents the identifier of the target resource of the url, that is, a status query address (id).

The method further includes: S12, querying a status of the target resource according to the identifier of the target resource carried in the access address.

In this step, after receiving the access address carrying the identifier of the target resource returned by the business server, the client accesses the business server by setting the access path. The business server queries the resource list that records the status of the target resource according to the identifier of the target resource to determine the status of the target resource. The status of the target resource includes an unmarked deleted status and a marked deleted status.

In order to realize the management of the resource list, as a possible implementation manner, the method further includes: receiving a deletion request for the target resource, and updating the status of the target resource in the resource list to a deleted status. The deletion request of the target resource is sent when the business side requests the resource server to delete the resource corresponding to the resource identifier.

Figure 2:
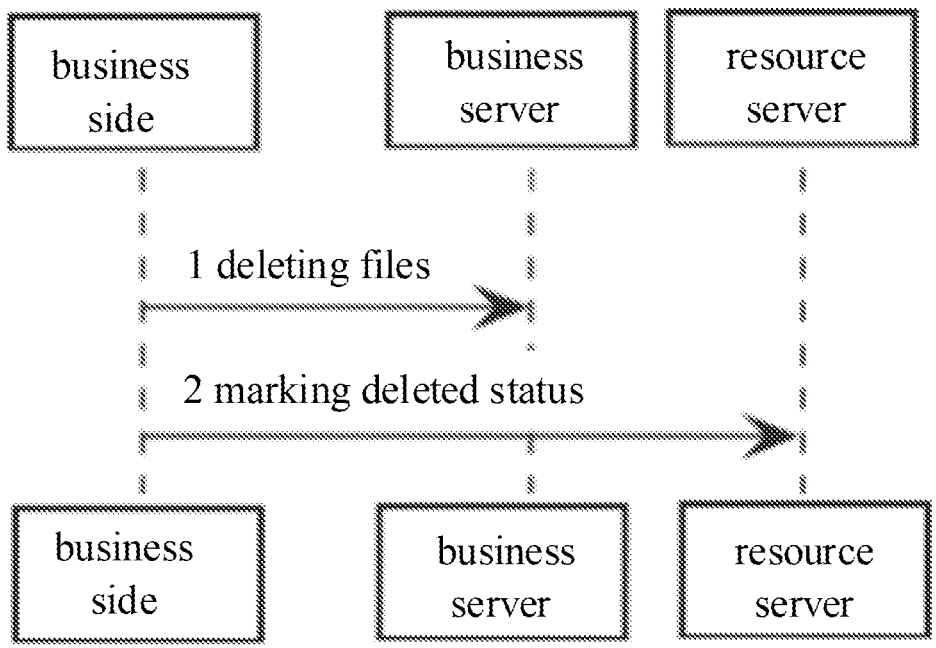
FIG. 2 is a schematic diagram showing a resource deletion according to an exemplary embodiment.

As shown in FIG. 2, in response to that there are illegal content in the resource corresponding to the resource identifier of the target resource such as videos and pictures from the We Media platform, the business side sends a request to the resource server to delete the resource corresponding to the resource identifier so that the resource server can delete the resource corresponding to the resource identifier, and at the same time, the deletion request of the target resource is sent to the business server, so that the business server marks the identifier of the target resource as a deleted status and updates the resource list.

In practical applications, after updating the resource list, the business server can store the resource list in the mysql database and use memcached (distributed cache system) for caching, which can make querying the target resource status very time-consuming, such as within 50 ms. At the same time, the time of the status change of the target resource taking effect is also very low, such as within 10 ms, which hardly increases the download time of the target resource. Compared with the time delay of several minutes or even hours consumed for deleting the target resource, the present disclosure can effectively accelerate the speed of blocking the target resource.

It should be noted that, in the embodiment of the present disclosure, the status of the resource in the resource server can be separately preserved, and the status of the resource is stored centrally, so that the status of the resource can be quickly changed and queried.

The method further includes: S13, sending, in response to the target resource being in a first status, a content distribution network address corresponding to the target resource to the client to cause the client to download the target resource according to the content distribution network address.

The first status indicates that the target resource is not marked as a deleted status.

In this step, when the business server determines that the target resource is not marked as deleted, it indicates that the client can download the target resource. At this time, the business server queries the content distribution network address associated with the access address, and sends the content distribution network address corresponding to the target resource to the client. After receiving the content distribution network address, the client can download the target resource according to the address.

In order to facilitate the user of the client to know whether the target resource is deleted in time, in an example of the present disclosure, when the content distribution network address corresponding to the target resource is sent to the client, a prompt message for prompting that the target resource is not deleted may also be carried.

The prompt information used to prompt that the target resource has not been deleted can be numbers, text, or letters. For example, the number can be "302", the text can be "not deleted", and the letter can be "RIGHT".

In other words, when determining that the status of the target resource is not deleted, the business server can redirect the client's resource access request to the target resource to the original resource address cdnUrl (content distribution network address) of the target resource, and returns the resource address cdnUrl to the client and sends out the prompt message, so that the user of the client side may be prompted that the target resource has not been deleted, and the client is allowed to access the original resource address cdnUrl of the target resource, and the target resource is downloaded from the resource server.

In the method provided by embodiments of the present disclosure, in response to receiving the resource access request from the client to the target resource, the business server determines the access address of the resource access request, the access address carries the identifier of the target resource, and then, the status of the target resource is queried according to the identifier of the target resource carried in the access address, and the content distribution network address corresponding to the target resource is sent to the client in response to that the target resource is not marked as deleted, so that the client downloads the target resource according to the content distribution network address. Therefore, this method firstly queries the status of the target resource before accessing the content distribution network address corresponding to the target resource, which hardly increases the resource download time, and while ensuring the download speed of large resources and accelerates the speed of blocking files that need to be offline.

Figure 3:
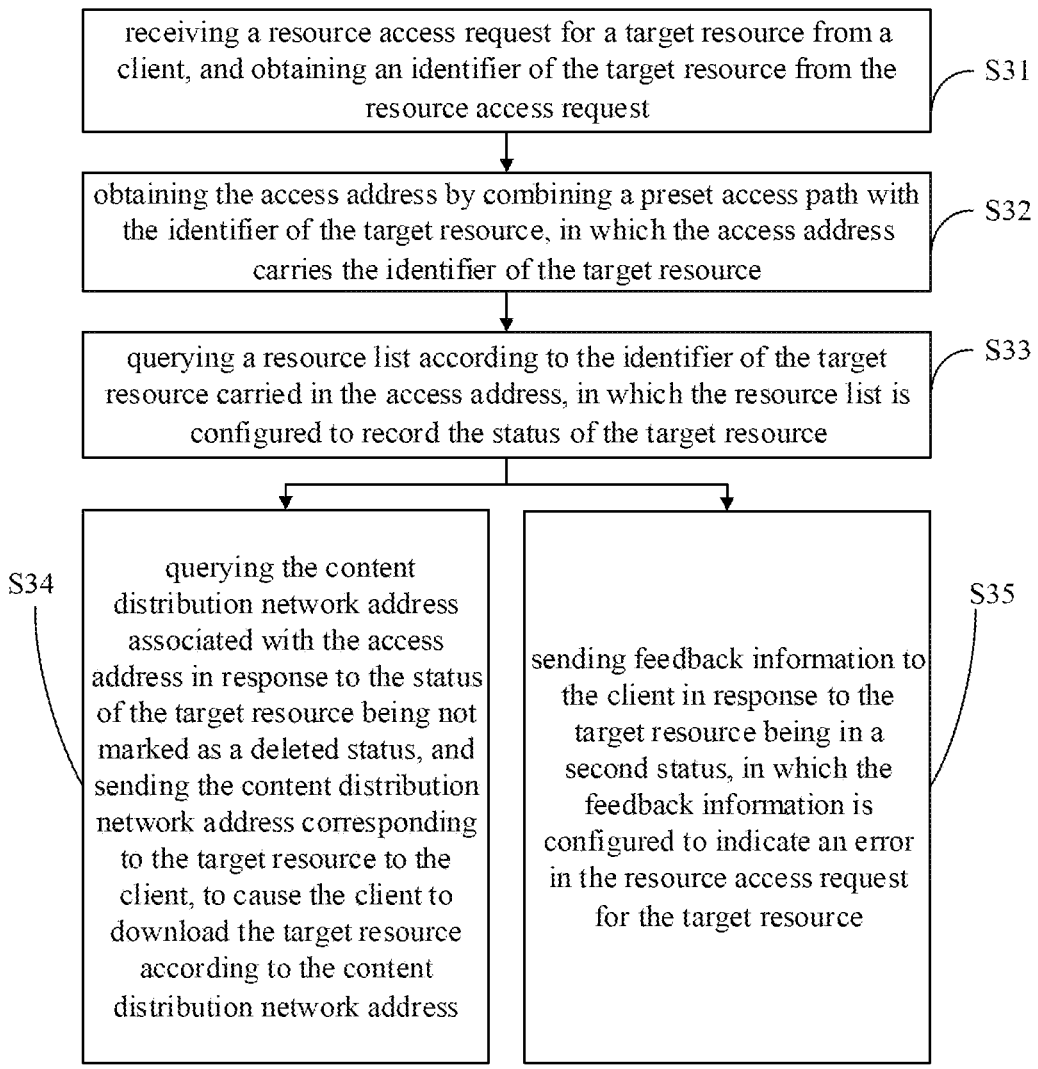
FIG. 3 is a flow chart showing a method for downloading resources according to another exemplary embodiment.

FIG. 3 is a flow chart showing a method for downloading resources according to another exemplary embodiment. As shown in FIG. 3, the method for downloading resources is applicable in a business server. The method includes: S31, receiving a resource access request for a target resource from a client, and obtaining an identifier of the target resource from the resource access request; S32, obtaining the access address by combining a preset access path with the identifier of the target resource, in which the access address carries the identifier of the target resource; S33, querying a resource list according to the identifier of the target resource carried in the access address, in which the resource list is configured to record the status of the target resource; S34, querying the content distribution network address associated with the access address in response to the status of the target resource being not marked as a deleted status, and sending the content distribution network address corresponding to the target resource to the client, to cause the client to download the target resource according to the content distribution network address.

It should be noted that, the specific process of steps S31-S34 refer to steps S11-S13, which will not be repeated in this embodiment.

The method further includes S35, sending feedback information to the client in response to the target resource being in a second status, in which the feedback information is configured to indicate an error in the resource access request for the target resource.

The feedback information can be numbers, text, letters, etc., for example, the number can be "404", the text can be "deleted", and the letter can be "ERROR".

In this step, in response to determining that the status of the target resource is the deleted status, the business server sends feedback information to the client to prompt the user that the target resource of the client has been blocked, and the client stops downloading the target resource.

For example, after noticing a resource access request for file sharing such as videos, pictures, etc., the user of the client establishes communication between the client and the business server by clicking, and sends the resource access request to the business server. The business server obtains the identifier of the target resource from the resource access request, and combines the preset access path and the identifier of the target resource to obtain the access address carrying the identifier of the target resource, that is, the URL with the resource id is used instead of the real cdnUrl. After obtaining the URL with the resource id, the business server queries the resource list according to the resource id to determine the status of the resource.

In response to that the status of the resource is not deleted, the client's resource access request to the target resource is redirected to the original resource address cdnUrl (content distribution network address) of the target resource, and the resource address cdnUrl is returned to the client and a prompt message is sent, such that the user of the client side is prompted in time that the target resource has not been deleted, and the client side is enabled to access the original resource address cdnUrl of the target resource, and the target resource is downloaded from the resource server.

In response to the status of the resource is the deleted status, the feedback information is sent to the client to prompt the user that the target resource of the client has been blocked, and the client stops downloading the target resource.

In the method provided by the embodiments of the present disclosure, the business server obtains the identifier of the target resource from the resource access request in response to receiving the resource access request of the client to the target resource, and the access address carrying the identifier of the target resource is obtained by combining the preset access path with the identifier of the target resource, and then the resource list that records the status of the target resource is queried according to the identifier of the target resource carried by the access address to determine the status of the target resource. In response to that the status of the target resource is not marked as a deleted status, the content distribution network address associated with the access address is queried, and the content distribution network address corresponding to the target resource is sent to the client, so that the client can download the target resource according to the content distribution network address. In response to that the status of the target resource has been marked as a deleted status, feedback information is sent to the client, the feedback information is used to indicate that the resource access request to the target resource has an error. As a result, in this method, the status of the target resource is queried before accessing the content distribution network address corresponding to the target resource, which hardly increases the download time of the target resource, and can reduce the time for blocking the resource in the resource server from minutes and hours level to milliseconds level, thus effectively speeding up the blocking of resources required to be offline.

Figure 4:
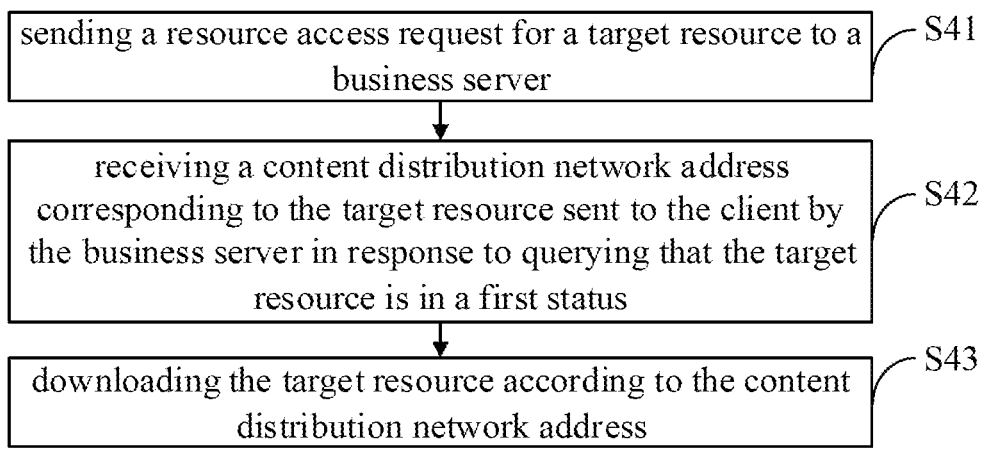
FIG. 4 is a flow chart showing a method for downloading resources according to another exemplary embodiment.

FIG. 4 is a flow chart showing a method for downloading resources according to another exemplary embodiment. As shown in FIG. 4, the method for downloading resources is applicable in a client and includes: S41, sending a resource access request for a target resource to a business server.

The server may be a backend server corresponding to the business end. The target resource may be a large resource file such as videos and pictures shared by the user through the terminal device to the We Media platform.

In this step, the client requests to connect to the server interface of the business server under the scenario of sharing via the We Media platform. The resource access request of the target resource may be sent to the business server. After receiving the resource access request of the target resource sent by the client, the business server first obtains the identifier of the target resource from the resource access request, and then combines the preset access path with the identifier of the target resource to obtain the access address carrying the identifier of the target resource and the access address is sent to the client. For example, the access address may be url:http//host/path?fileId=x, where http represents the url (Uniform Resource Locator) protocol, host represents a host of the url, path represents a preset access path of the url, and fileld=x represents the identifier of the target resource of the url, that is, a status query address (id).

After receiving the access address carrying the identifier of the target resource returned by the business server, the client determines the status of the target resource by setting the access path, and querying the resource list that records the status of the target resource according to the identifier of the target resource. The status of the target resource includes an unmarked deleted status and a marked deleted status.

In order to realize the management of the resource list, as shown in FIG. 2, if the business side finds illegal content in the resource corresponding to the resource identifier of the target resource such as videos and pictures from the We Media platform, a request to delete the resource corresponding to the resource identifier is sent to the resource server, such that the resource server deletes the resource corresponding to the resource identifier, and at the same time, sends a deletion request of the target resource to the business server, so that the business server marks the identifier of the target resource as a deleted status and updates the resource list.

In practical applications, after updating the resource list, the business server can store the resource list in the mysql database and use memcached (distributed cache system) for caching, which can make querying the target resource status very time-consuming, such as within 50 ms. At the same time, the time of the status change of the target resource taking effect is also very low, such as within 10 ms, which hardly increases the download time of the target resource. Compared with the time delay of several minutes or even hours consumed for deleting the target resource, the present disclosure can effectively accelerate the speed of blocking the target resource.

It should be noted that, in the embodiment of the present disclosure, the status of the resource in the resource server can be separately preserved, and the status of the resource is stored centrally, so that the status of the resource can be quickly changed and queried.

The method further includes: S42, receiving a content distribution network address corresponding to the target resource sent to the client by the business server in response to querying that the target resource is in a first status.

The first status indicates that the target resource is not marked as a deleted status.

In this step, when the business server determines that the target resource is not marked as deleted, it indicates that the client can download the target resource. At this time, the business server queries the content distribution network address associated with the access address, and sends the content distribution network address corresponding to the target resource to the client. After receiving the content distribution network address, the client can download the target resource according to the address.

In order to facilitate the user of the client to know whether the target resource is deleted in time, in an example of the present disclosure, in response to that the content distribution network address corresponding to the target resource is sent to the client, a prompt message for prompting that the target resource is not deleted may also be carried.

The prompt information used to prompt that the target resource has not been deleted can be numbers, text, or letters. For example, the number can be "302", the text can be "not deleted", and the letter can be "RIGHT".

The method further includes: S43, downloading the target resource according to the content distribution network address.

In this step, when the business server determines that the status of the target resource is not deleted, it can redirect the client's resource access request to the target resource to the original resource address cdnUrl (content distribution network address) of the target resource, and the resource address cdnUrl is returned to the client and a prompt message is sent, so that the user of the client is promptly prompted that the target resource has not been deleted, and the client is allowed to access the original resource address cdnUrl of the target resource, and download the target resource from the resource server.

In the method provided by the embodiments of the present disclosure, the client sends a resource access request of the target resource to the business server, and receives the content distribution corresponding to the target resource sent by the business server in response to that the target resource is in the first status. The target resource is downloaded according to the content distribution network address. Therefore, this method firstly queries the status of the target resource before accessing the content distribution network address corresponding to the target resource, which hardly increases the resource download time, and while ensuring the download speed of large resources and accelerates the speed of blocking files that need to be taken offline.

Figure 5:
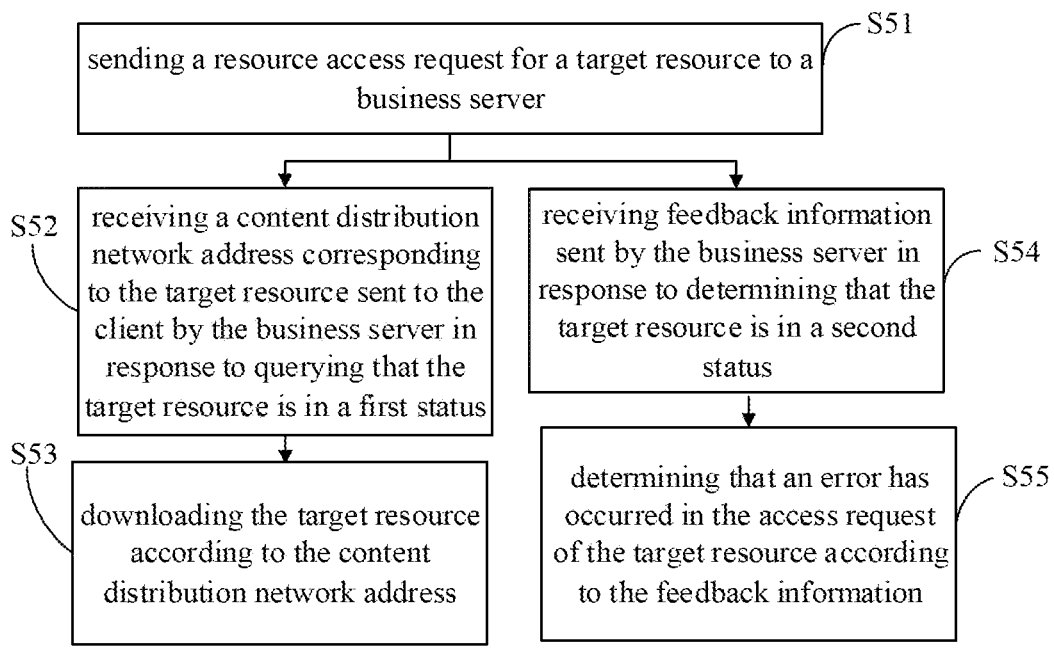
FIG. 5 is a flow chart showing a method for downloading resources according to another exemplary embodiment.

FIG. 5 is a flow chart showing a method for downloading resources according to another exemplary embodiment. As shown in FIG. 5, the method for downloading resources is used in a client and includes: S51, sending a resource access request for a target resource to a business server; S52, receiving a content distribution network address corresponding to the target resource sent to the client by the business server in response to querying that the target resource is in a first status; S53, downloading the target resource according to the content distribution network address.

It should be noted that, the specific process of steps S51-S53 refer to steps S41-S43, which will not be repeated in this embodiment.

The method also includes: S54, receiving feedback information sent by the business server in response to determining that the target resource is in a second status.

The second status indicates that the target resource is marked as the deleted status.

The feedback information can be numbers, text, letters, etc., for example, the number can be "404", the text can be "deleted", and the letter can be "ERROR".

The method also includes: S55, determining that an error has occurred in the access request of the target resource according to the feedback information.

The specific implementation process of step S54 and step S55 is as follows. When the business server determines that the status of the target resource is the deleted status, it sends feedback information to the client to remind the client that the user target resource has been blocked, and to stop the client from downloading the target resource.

For example, after noticing a resource access request for file sharing such as videos, pictures, etc., the user of the client establishes communication between the client and the business server by clicking, and sends the resource access request to the business server. The business server obtains the identifier of the target resource from the resource access request, and combines the preset access path and the identifier of the target resource to obtain the access address carrying the identifier of the target resource, that is, the URL with the resource id is used instead of the real cdnUrl. After obtaining the URL with the resource id, the business server queries the resource list according to the resource id to determine the status of the resource.

In response to that the status of the resource is not deleted, the client's resource access request to the target resource is redirected to the original resource address cdnUrl (content distribution network address) of the target resource, and the resource address cdnUrl is returned to the client and a prompt message is sent, such that the user of the client side is prompted in time that the target resource has not been deleted, and the client side is enabled to access the original resource address cdnUrl of the target resource, and the target resource is downloaded from the resource server.

In response to the status of the resource is the deleted status, the feedback information is sent to the client to prompt the user that the target resource of the client has been blocked, and the client stops downloading the target resource.

In the method provided by the embodiments of the present disclosure, after the client sends a resource access request of the target resource to the business server, a content distribution network address corresponding to the target resource is sent to the client in response to that the target resource is in the first status queried by the business server, and the target resource is downloaded according to the content distribution network address, and the feedback information sent by the business server is received in response to determining that the target resource is in the second status, it is determined that an error has occurred in the access request of the target resource according to the feedback information. As a result, in this method, the status of the target resource is queried before accessing the content distribution network address corresponding to the target resource, which hardly increases the download time of the target resource, and can reduce the time for blocking the resource in the resource server from minutes and hours level to milliseconds level, thus effectively speeding up the blocking of resources required to be offline.

Figure 6:
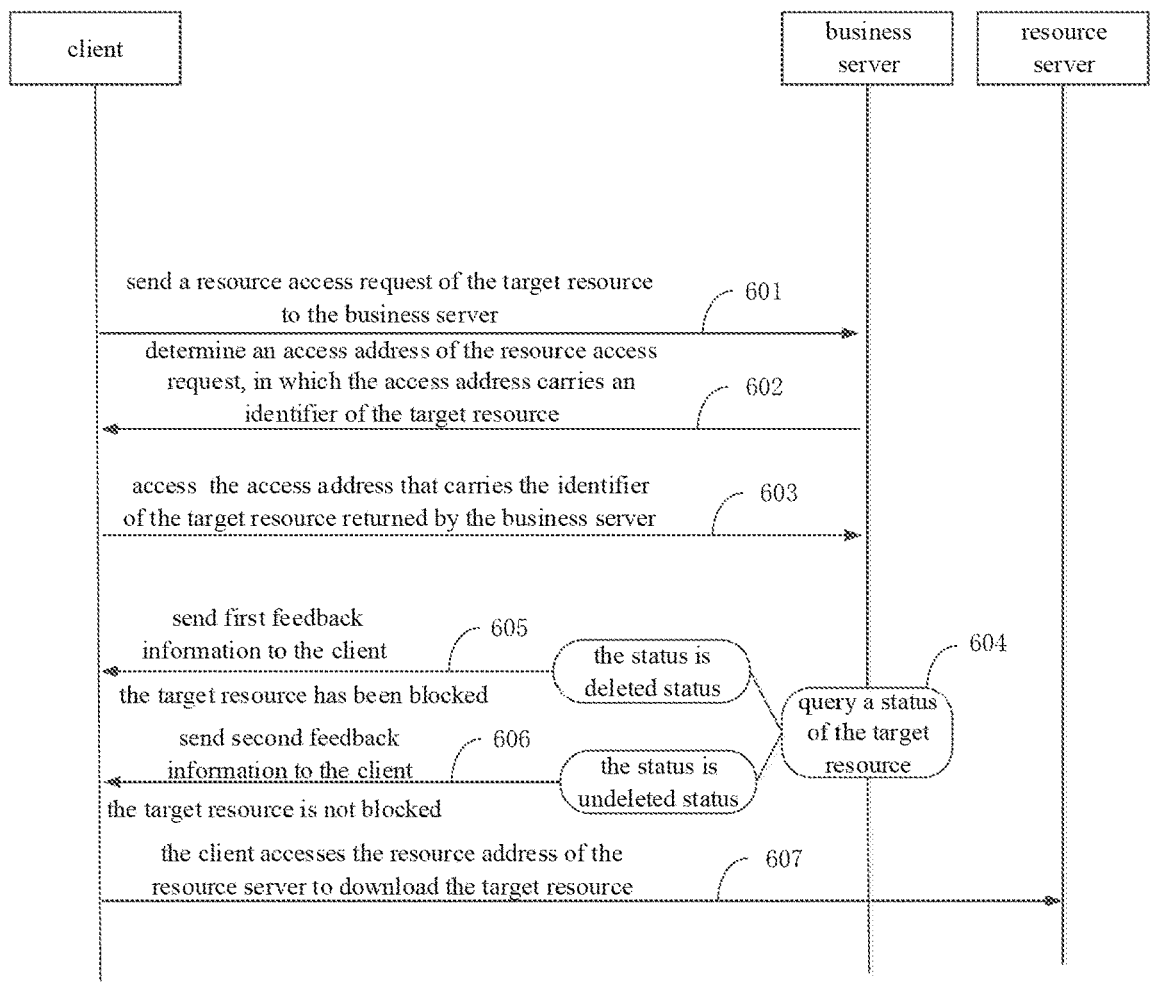
FIG. 6 is a flow chart showing a resource download interaction method according to an exemplary embodiment.

In order to implement the foregoing embodiment, this embodiment provides a resource download interaction method. As shown in FIG. 6, the resource download interaction method includes the followings.

In S601, the client sends a resource access request of the target resource to the business server.

The server is a backend server corresponding to the business end. The target resource can be a large resource file such as videos and pictures shared by the user through the terminal device to a We Media platform.

In this step, the client requests to connect to the server interface of the business server under the scenario of sharing from the We Media platform, and sends the resource access request of the target resource to the business server.

In S602, the business server determines an access address of the resource access request, in which the access address carries an identifier of the target resource.

In this step, after receiving the resource access request of the target resource, the business server determines an access address carrying the identifier of the target resource to the client, for example, an address url:http//host/path?fileld=x is returned, where http is the url (Uniform Resource Locator) protocol, host represents a host of the url, path represents a preset access path of the url, and fileld=x represents the identifier of the target resource of the url, that is, a status query address (id).

In S603, the client accesses the access address that carries the identifier of the target resource returned by the business server.

In this step, after receiving the access address carrying the identifier of the target resource returned by the business server, the client accesses the access address and tries to download the target resource.

In S604, the business server queries a status of the target resource according to the identifier of the target resource carried in the access address.

In this step, the business server queries the resource list that records the status of the target resource according to the identifier of the target resource to determine the status of the target resource. The status of the target resource includes an unmarked deleted status and a marked deleted status.

It should be noted that, in response to that the business server determines that the status of the target resource is the deleted status in step S604, the step S605 is executed; in response to the business server determines that the status of the target resource is the undeleted status in step S604, the step S606 is executed.

In S605, the business server sends first feedback information to the client, in which the first feedback information is configured to prompt the client that the target resource has been blocked.

In this step, the business server sends the first feedback information for prompting the client that the target resource has been blocked to the client to prompt the user that the target resource has been blocked.

In S606, the business server sends second feedback information to the client, in which the second feedback information carries the resource address in the target resource server and prompt information indicating that the target resource is not blocked.

In this step, the business server sends to the client a prompt message carrying the resource address in the target resource server and indicating the target resource is not blocked, so as to remind the user that the target resource is not blocked, and allow the client to download the target resource.

In S607, the client accesses the resource address of the resource server to download the target resource.

In this step, the client downloads the target resource according to the resource address of the target resource.

In the resource download interaction method provided by the embodiments of the present disclosure, when the client downloads the target resource, it does not directly access the resource server, but first accesses the business server, so that the business server can query the status of the target resource. In response to that the status of the target resource is a deleted status, the client is prompted to indicate that the target resource has been blocked, and the download of the target resource is stopped; in response to that the status of the target resource is the undeleted status, the client is prompted to indicate that the target resource is not blocked, so as to start downloading the target resource. As a result, in this method, the status of the target resource is queried before accessing the content distribution network address corresponding to the target resource, which hardly increases the download time of the target resource, and can reduce the time for blocking the resource in the resource server from minutes and hours level to milliseconds level, thus effectively speeding up the blocking of resources required to be offline.

Figure 7:
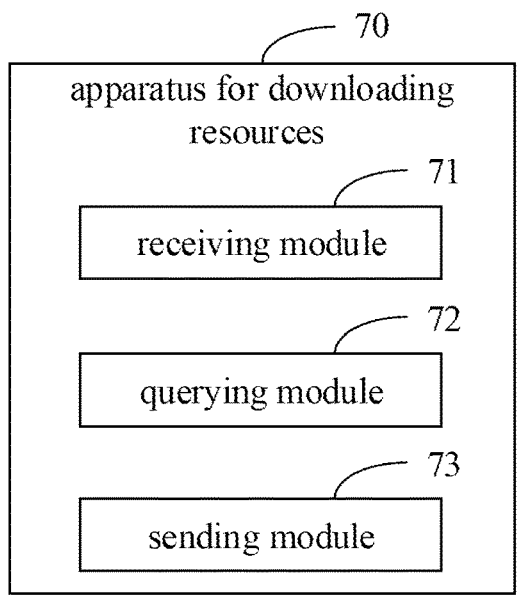
FIG. 7 is a block diagram showing an apparatus for downloading resources according to an exemplary embodiment.

FIG. 7 is a block diagram showing an apparatus for downloading resources according to an exemplary embodiment. Referring to FIG. 7, the apparatus 70 includes: a receiving module 71, a querying module 72, and a sending module 73.

The receiving module 71 is configured to receive a resource access request for a target resource from a client, and determine an access address of the resource access request, wherein the access address carries an identifier of the target resource.

The querying module 72 is configured to query a status of the target resource according to the identifier of the target resource carried in the access address.

The sending module 73 is configured to send, in response to the target resource being in a first status, a content distribution network address corresponding to the target resource to the client to cause the client downloading the target resource according to the content distribution network address.

In a possible implementation of the embodiment of the present disclosure, the sending module 73 is further configured to send, in response to the target resource being in a second status, feedback information to the client, wherein the feedback information is configured to indicate an error in the resource access request for the target resource.

In a possible implementation manner of the embodiment of the present disclosure, the first status indicates that the target resource is not marked as a deleted status; and the second status indicates that the target resource is marked as the deleted status.

In a possible implementation manner of the embodiment of the present disclosure, the query module 72 includes a querying unit, a first sending unit, and a second sending unit.

The query unit is configured to query a resource list according to the identifier of the target resource carried in the access address, wherein the resource list is configured to record the status of the target resource.

The first sending unit is configured to send the content distribution network address corresponding to the target resource to the client in response to the status of the target resource being marked as an undeleted status.

The second sending unit is configured to send the feedback information to the client in response to the status of the target resource being marked as the deleted status.

In a possible implementation manner of the embodiment of the present disclosure, the apparatus further includes an updating module.

The updating module is configured to receive a deletion request for the target resource, and update the status of the target resource in the resource list to a deleted status.

In a possible implementation manner of the embodiment of the present disclosure, the receiving module 71 includes: an obtaining unit, and a combining unit.

The obtaining unit is configured to acquire the identifier of the target resource from the resource access request.

The combining unit is configured to acquire the access address by combining a preset access path with the identifier of the target resource.

In a possible implementation manner of the embodiment of the present disclosure, the sending module 73 is further configured to: query the content distribution network address associated with the access address, wherein the access address is sent to the client before the content distribution network address corresponding to the target resource is sent to the client.

In actual use, the apparatus provided by the embodiment of the present disclosure can be configured in a server to execute the method for downloading resources shown in FIG. 1 and FIG. 3. Therefore, with regard to the apparatus in the foregoing embodiment, the specific manner in which each module performs operations has been described in detail in the embodiment of the method, and will not be elaborated here.

In the apparatus provided by the embodiments of the present disclosure, the receiving module is configured to receive a resource access request for a target resource from a client, and determine an access address of the resource access request, wherein the access address carries an identifier of the target resource, the querying module is configured to query a status of the target resource according to the identifier of the target resource carried in the access address, the sending module is configured to send, in response to the target resource being in a first status, a content distribution network address corresponding to the target resource to the client to cause the client downloading the target resource according to the content distribution network address. As a result, in this method, the status of the target resource is queried before accessing the content distribution network address corresponding to the target resource, which hardly increases the download time of the target resource, and can reduce the time for blocking the resource in the resource server from minutes and hours level to milliseconds level, thus effectively speeding up the blocking of resources required to be offline.

In order to implement the above embodiments, the present disclosure also proposes a server.

The server includes a processor and a memory for storing executable instructions of the processor. The processor is configured to execute instructions to implement the method for downloading resources as described in FIG. 1 and FIG. 3.

In order to implement the above-mentioned embodiments, the present disclosure also proposes a storage medium.

When the instructions in the storage medium are executed by the processor of the server, the server can execute the method for downloading resources as shown in FIG. 1 and FIG. 3.

In order to implement the above-mentioned embodiments, the present disclosure also provides a computer program product.

When the computer program is executed by the processor of the server, the server can execute the method for downloading resources shown in FIG. 1 and FIG. 3.

Figure 8:
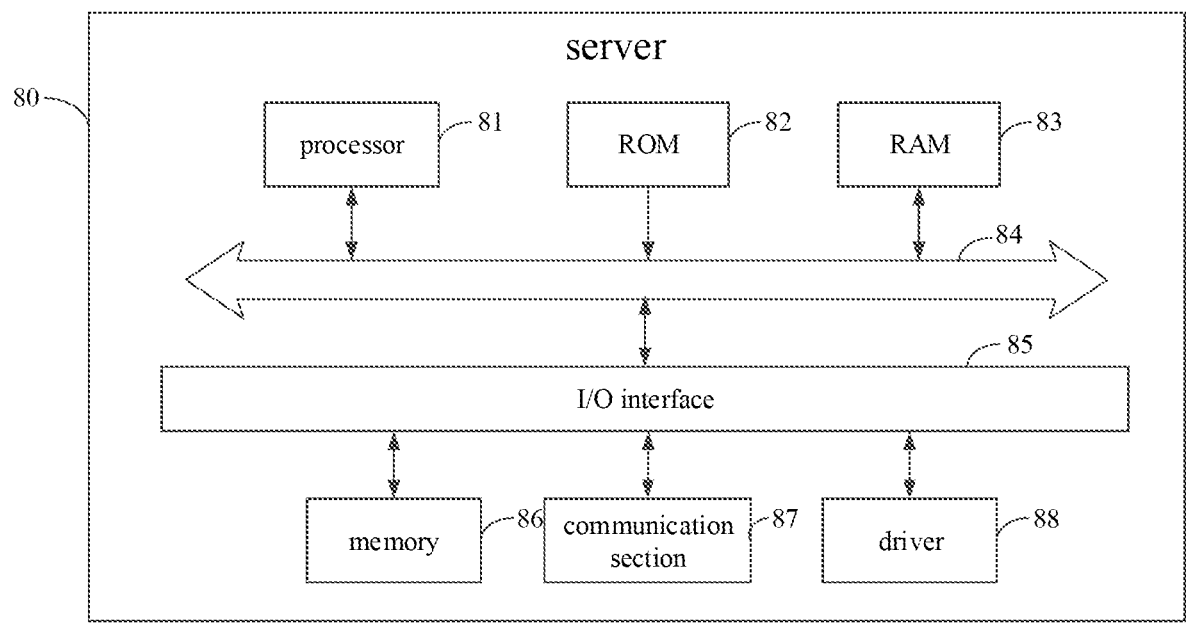
FIG. 8 is a block diagram showing a server according to an exemplary embodiment.

FIG. 8 is a block diagram showing a server according to an exemplary embodiment. The server shown in FIG. 8 is only an example, and should not bring any limitation to the function and scope of use of the embodiments of the present disclosure.

As shown in FIG. 8, the server 80 includes a processor 81, which can follow a program stored in a read only memory (ROM) 82 or a program loaded from the memory 86 to a random access memory (RAM) 83 and perform various appropriate actions and processing. In the RAM 83, various programs and data necessary for the operation of the server 80 are also stored. The processor 81, the ROM 82, and the RAM 83 are connected to each other through a bus 84. An input/output (I/O) interface 85 is also connected to the bus 84.

The following components are connected to the I/O interface 85: a memory 86 including a hard disk, etc.; and a communication section 87 including a network interface card such as a LAN (Local Area Network) card, a modem, etc., which is executed via a network such as the Internet Communication processing; the driver 88 is also connected to the I/O interface 85 as needed.

In particular, according to an embodiment of the present disclosure, the process described above with reference to the flowchart can be implemented as a computer software program. For example, the embodiments of the present disclosure include a computer program carried on a computer-readable medium, and the computer program contains program code for executing the method shown in the flowchart. In such an embodiment, the computer program can be downloaded and installed from the network through the communication section 87. When the computer program is executed by the processor 81, the above-mentioned functions defined in the method of the present disclosure are executed.

In an exemplary embodiment, there is also provided a storage medium including instructions, such as a memory including instructions, and the foregoing instructions may be executed by the processor 81 of the server 80 to complete the foregoing method. Alternatively, the storage medium may be a non-transitory computer-readable storage medium, for example, the non-transitory computer-readable storage medium may be ROM, random access memory (RAM), CD-ROM, magnetic tape, floppy disk, and optical data storage equipment, etc.

In the present disclosure, a computer-readable storage medium may be any tangible medium that contains or stores a program, and the program may be used by or in combination with an instruction execution system, apparatus, or device. In the present disclosure, a computer-readable signal medium may include a data signal propagated in a baseband or as a part of a carrier wave, and a computer-readable program code is carried therein. This propagated data signal can take many forms, including but not limited to electromagnetic signals, optical signals, or any suitable combination of the foregoing. The computer-readable signal medium may also be any computer-readable medium other than a computer-readable storage medium. The computer-readable medium may send, propagate, or transmit the program for use by or in combination with the instruction execution system, apparatus, or device. The program code contained on the computer-readable medium can be transmitted by any suitable medium, including but not limited to: wireless, wire, optical cable, RF, etc., or any suitable combination of the above.

Figure 9:
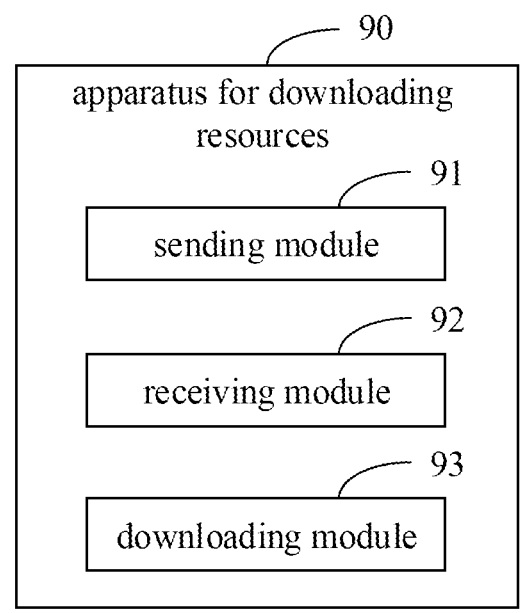
FIG. 9 is a block diagram showing an apparatus for downloading resources according to another exemplary embodiment.

FIG. 9 is a block diagram showing an apparatus for downloading resources according to another exemplary embodiment. Referring to FIG. 9, the apparatus 90 includes: a sending module 91, a receiving module 92 and a downloading module 93.

The sending module 91 is configured to send a resource access request for a target resource to a business server.

The receiving module 92 is configured to receive the content distribution network address corresponding to the target resource that is sent by the business server to the client when the target resource is in the first status.

The download module 93 is configured to download the target resource according to the content distribution network address.

In a possible implementation manner of the embodiment of the present disclosure, the receiving module 92 is further configured to receive feedback information sent by the business server in response to determining that the target resource is in the second status. The apparatus also includes a determining module, which is configured to determine that an error occurs in the access request of the target resource according to the feedback information.

In a possible implementation manner of the embodiment of the present disclosure, the first status indicates that the target resource is not marked as a deleted status; and the second status indicates that the target resource is marked as the deleted status.

In actual use, the apparatus for downloading resources provided by the embodiment of the present disclosure may be configured in an electronic device to execute the method for downloading resources shown in FIG. 4 and FIG. 5. Therefore, with regard to the device in the foregoing embodiment, the specific manner in which each module performs operations has been described in detail in the embodiment of the method, and will not be elaborated here.

The apparatus for downloading resources provided by the embodiment of the present disclosure, a resource access request of a target resource is sent to the business server through a sending module, and the target resource sent to the client is received by the business server in response to that the target resource is in the first status through the receiving module. The target resource is downloaded according to the content distribution network address through the download module 93. As a result, the status of the target resource is queried before accessing the content distribution network address corresponding to the target resource, which hardly increases the download time of the target resource, and can reduce the time for blocking the resource in the resource server from minutes and hours level to milliseconds level, thus effectively speeding up the blocking of resources required to be offline.

In order to implement the above-mentioned embodiments, the present disclosure also proposes an electronic device.

The electronic device includes a processor and a memory for storing executable instructions of the processor, in which the processor is configured to execute instructions to implement the method for downloading resources as described in FIG. 4 and FIG. 5.

In order to implement the above-mentioned embodiments, the present disclosure also proposes a storage medium.

When the instructions in the storage medium are executed by the processor of the electronic device, the electronic device is enabled to execute the method for downloading resources shown in FIG. 4 and FIG. 5.

In order to implement the above-mentioned embodiments, the present disclosure also provides a computer program product.

When the computer program is executed by the processor of the electronic device, the electronic device can execute the method for downloading resources shown in FIG. 4 and FIG. 5.

Figure 10:
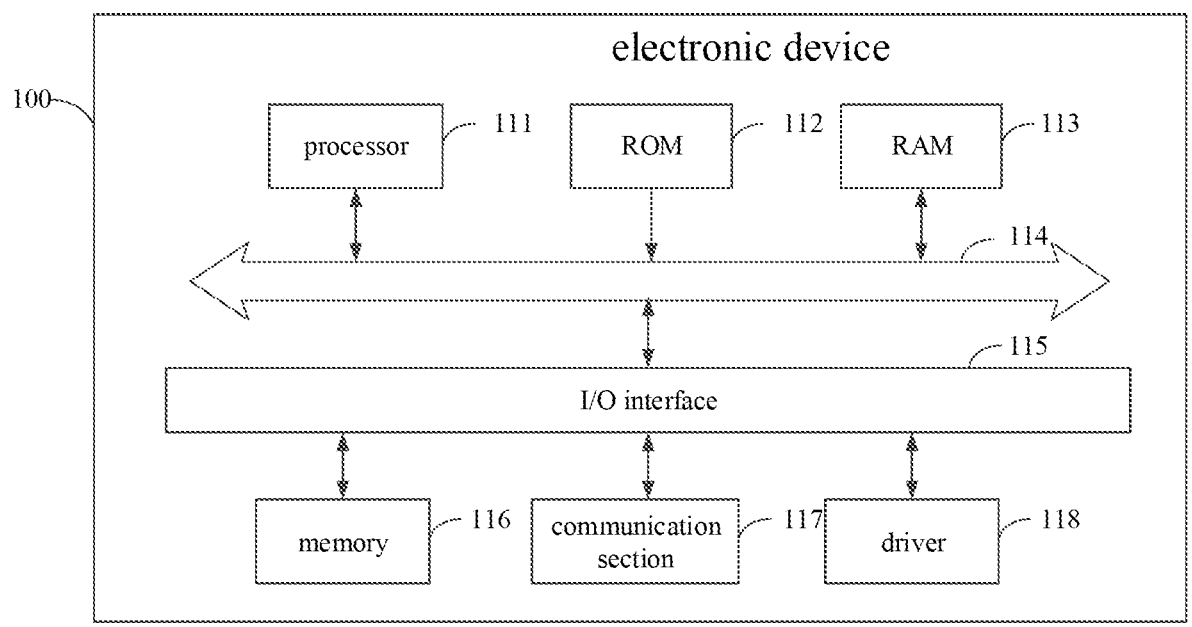
FIG. 10 is a block diagram showing an electronic device according to an exemplary embodiment.

FIG. 10 is a block diagram showing an electronic device according to an exemplary embodiment. The electronic device shown in FIG. 10 is only an example, and should not bring any limitation to the function and use range of the embodiments of the present disclosure.

As shown in FIG. 10, the electronic device 100 includes a processor 111, which can be loaded into a random access memory (RAM) 113 according to a program stored in a read only memory (ROM) 112 or a program loaded from the memory 116 to a random access memory (RAM) 113 and perform various appropriate actions and processing. In the RAM 113, various programs and data necessary for the operation of the electronic device 100 are also stored. The processor 111, the ROM 112, and the RAM 113 are connected to each other through a bus 114. An input/output (I/O) interface 115 is also connected to the bus 114.

The following components are connected to the I/O interface 115: a memory 116 including a hard disk, etc.; and a communication section 117 including a network interface card such as a LAN (Local Area Network) card, a modem, etc., which is executed via a network such as the Internet Communication processing; the driver 18 is also connected to the I/O interface 115 as needed.

In particular, according to an embodiment of the present disclosure, the process described above with reference to the flowchart can be implemented as a computer software program. For example, the embodiments of the present disclosure include a computer program carried on a computer-readable medium, and the computer program contains program code for executing the method shown in the flowchart. In such an embodiment, the computer program can be downloaded and installed from the network through the communication section 117. When the computer program is executed by the processor 111, the above-mentioned functions defined in the method of the present disclosure are executed.

In an exemplary embodiment, there is also provided a storage medium including instructions, such as a memory including instructions, and the foregoing instructions may be executed by the processor 111 of the electronic device 100 to complete the foregoing method. Alternatively, the storage medium may be a non-transitory computer-readable storage medium, for example, the non-transitory computer-readable storage medium may be ROM, random access memory (RAM), CD-ROM, magnetic tape, floppy disk, and optical data storage equipment, etc.

In the present disclosure, a computer-readable storage medium may be any tangible medium that contains or stores a program, and the program may be used by or in combination with an instruction execution system, apparatus, or device. In the present disclosure, a computer-readable signal medium may include a data signal propagated in a baseband or as a part of a carrier wave, and a computer-readable program code is carried therein. This propagated data signal can take many forms, including but not limited to electromagnetic signals, optical signals, or any suitable combination of the foregoing. The computer-readable signal medium may also be any computer-readable medium other than a computer-readable storage medium. The computer-readable medium may send, propagate, or transmit the program for use by or in combination with the instruction execution system, apparatus, or device. The program code contained on the computer-readable medium can be transmitted by any suitable medium, including but not limited to: wireless, wire, optical cable, RF, etc., or any suitable combination of the above.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope of the present disclosure. It is intended that the scope of the present disclosure only be limited by the attached claims.

What is claimed is:

1. A method for downloading resources, comprising:
receiving a resource access request for a target resource from a client, and determining an access address of the resource access request, wherein the access address carries an identifier of the target resource;
querying a status of the target resource in a resource list by using the identifier of the target resource carried in the access address, wherein the resource list is configured to record the status of the target resource;
sending, in response to the target resource being in a first status indicating that the target resource is not marked as a deleted status, a content distribution network address corresponding to the target resource to the client to cause the client to download the target resource according to the content distribution network address; and
receiving a deletion request for the target resource, and updating the status of the target resource in the resource list, wherein the deletion request of the target resource is configured to request a resource server to delete resource corresponding to the identifier.

2. The method of claim 1, further comprising:
sending, in response to the target resource being in a second status indicating that the target resource is marked as the deleted status, feedback information to the client, wherein the feedback information is configured to indicate an error in the resource access request for the target resource.

3. The method of claim 1, wherein determining the access address of the resource access request comprises:
acquiring the identifier of the target resource from the resource access request; and
acquiring the access address by combining a preset access path with the identifier of the target resource.

4. The method of claim 1, further comprising:
querying the content distribution network address associated with the access address, wherein the access address is sent to the client before the content distribution network address corresponding to the target resource is sent to the client.

5. An apparatus for downloading resources, comprising:
one or more processors;
a memory storing instructions executed by the one or more processors,
wherein the one or more processors are configured to execute the instruction to:
receive a resource access request for a target resource from a client, and determine an access address of the resource access request, wherein the access address carries an identifier of the target resource;
query a status of the target resource in a resource list by using the identifier of the target resource carried in the access address, wherein the resource list is configured to record the status of the target resource;
send, in response to the target resource being in a first status indicating that the target resource is not marked as a deleted status, a content distribution network address corresponding to the target resource to the client to cause the client to download the target resource according to the content distribution network address; and
receive a deletion request for the target resource and update the status of the target resource in the resource list, wherein the deletion request of the target resource is configured to request a resource server to delete resource corresponding to the identifier.

6. The apparatus of claim 5, wherein the one or more processors are configured to execute the instruction to:
send, in response to the target resource being in a second status indicating that the target resource is marked as the deleted status, feedback information to the client, wherein the feedback information is configured to indicate an error in the resource access request for the target resource.

7. The apparatus of claim 5, wherein the one or more processors are configured to execute the instruction to:
    acquire the identifier of the target resource from the resource access request; and
    acquire the access address by combining a preset access path with the identifier of the target resource.

8. The apparatus of claim 5, wherein the one or more processors are configured to execute the instruction to:
    query the content distribution network address associated with the access address, wherein the access address is sent to the client before the content distribution network address corresponding to the target resource is sent to the client.

9. A non-transitory computer-readable storage medium, wherein when an instruction stored therein is executed by a processor in an electronic device, the processor is caused to perform a method for downloading resources, and the method comprises:
    receiving a resource access request for a target resource from a client, and determining an access address of the resource access request, wherein the access address carries an identifier of the target resource;
    querying a status of the target resource in a resource list by using the identifier of the target resource carried in the access address, wherein the resource list is configured to record the status of the target resource;
    sending, in response to the target resource being in a first status indicating that the target resource is not marked as a deleted status, a content distribution network address corresponding to the target resource to the client to cause the client to download the target resource according to the content distribution network address; and
    receiving a deletion request for the target resource and updating the status of the target resource in the resource list, wherein the deletion request of the target resource is configured to request a resource server to delete resource corresponding to the identifier.

10. The non-transitory computer-readable storage medium of claim 9, wherein the method further comprises:
    sending, in response to the target resource being in a second status indicating that the target resource is marked as the deleted status, feedback information to the client, wherein the feedback information is configured to indicate an error in the resource access request for the target resource.

11. The non-transitory computer-readable storage medium of claim 9, wherein determining the access address of the resource access request comprises:
    acquiring the identifier of the target resource from the resource access request; and
    acquiring the access address by combining a preset access path with the identifier of the target resource.

12. The non-transitory computer-readable storage medium of claim 9, wherein the method further comprises:
    querying the content distribution network address associated with the access address, wherein the access address is sent to the client before the content distribution network address corresponding to the target resource is sent to the client.

* * * * *